Patented Mar. 18, 1930

1,751,274

UNITED STATES PATENT OFFICE

ROBERT R. FULTON, OF WILKINSBURG, PENNSYLVANIA, ASSIGNOR TO THE KOPPERS COMPANY, A CORPORATION OF PENNSYLVANIA

PROCESS FOR OBTAINING THIOCYANATES OF THE ALKALINE-EARTH METALS

No Drawing. Application filed December 23, 1926. Serial No. 156,756.

My invention relates to a process for obtaining alkaline earth metal thiocyanate from complex liquors, such as gas purification liquors produced in the treatment of fuel gas with alkaline absorbent liquids for the removal of acidic constituents. In general, such liquors contain sodium thiocyanate, sodium thiosulphate, sodium carbonate, sodium bicarbonate and sodium ferrocyanide in varying amounts, and also colloidal and suspended matter, coloring matter, dirt, etc.

An object of my invention is to provide a process of treating a liquor of the character indicated above to obtain a valuable product therefrom.

A second object of my invention is to provide a process of obtaining alkaline earth metal thiocyanate in substantially pure form from a crude and complex liquor.

A further object of my invention is to accomplish the conversion of undesirable soluble constituents of gas purification liquor into insoluble materials capable of being separated from the desired product by a simple operation.

A further object of my invention is to provide a process of removing a soluble foreign material such as sodium chloride from a solution of alkaline earth metal thiocyanate.

A still further object of my invention is to provide a process of removing colloidal matter, coloring matter and dirt from a solution of alkaline earth metal thiocyanate.

My invention has for further objects such other operative advantages or results as may hereinafter be found to obtain.

In the specific instance which will be described hereinbelow, my invention is described with reference to the preparation of alkaline earth metal thiocyanate from a gas purification liquor in which the various salts, such as the thiocyanate, thiosulphate and carbonate, are combined with sodium. This process requires a preliminary conversion of such sodium salts to alkaline earth metal salts. However, my invention is not limited to the treatment of liquors containing principally sodium compounds but may be applied to other alkali compounds, or to liquors which consist originally of alkaline earth metal compounds of the general character indicated.

My invention contemplates the preparation of thiocyanate of any alkaline earth metal, such as calcium, magnesium, or the like. For convenience, however, the description will henceforth be limited to the preparation of calcium thiocyanate, it being understood that other alkaline earth metal and thiocyanates may be correspondingly recovered or prepared.

In practicing my invention, I may treat the liquor from a gas purification process directly, but I prefer to start with such a liquor after it has been treated by any suitable process for the removal of most of the thiosulphate therefrom.

An example of such a liquor is illustrated by the following analysis:

Sodium thiocyanate (NaCNS)_____ 700 grams per liter.
Sodium thiosulphate ($Na_2S_2O_3$)_____ 200 grams per liter.
Sodium carbonate ($Na_2CO_3$)_____ 12 grams per liter.
Sodium ferrocyanide ($Na_4Fe(CN)_6$)__ 34 grams per liter.
Colloidal matter, coloring matter, dirt,
etc_____ Present.

In order to accomplish the conversion of sodium salts to calcium salts and particularly of sodium thiocyanate to calcium thiocyanate, I treat the liquor with a soluble calcium salt, such as calcium chloride ($CaCl_2$). After such treatment, the sodium thiocyanate will be converted to calcium thiocyanate and the sodium thiosulphate will, of course, be converted to calcium thiosulphate. The solubility of the latter is so near to that of the calcium thiocyanate that separation of these two materials by ordinary means is difficult and tedious. I have discovered that, if the liquor after treatment with the calcium salt is heated to near the boiling point, the calcium thiosulphate will be decomposed, with resultant formation of the almost completely insoluble calcium sulphite and sulphur. This reaction probably proceeds as follows:

$$CaS_2O_3 = CaSO_3 + S.$$

The calcium sulphite, sulphur and the insoluble products resulting from the treatment with calcium chloride (i. e., calcium carbonate, calcium sodium ferrocyanide, etc.), as well as part of the sodium chloride and most of the colloidal matter, coloring matter, dirt, etc., may now be removed by filtration. The filtrate is a clear and nearly pure solution of calcium thiocyanate and may be concentrated without further treatment to yield crude crystalline calcium thiocyanate.

When it is desired to remove the small amounts of salt, colloidal matter, coloring matter, dirt, etc., present in the liquor as obtained above, I treat the solution with an agent capable of oxidizing, bleaching, or precipitating the colloidal matter, coloring matter and dirt. Such agents, for convenience, and since their use is understood, will hereinafter be designated as "precipitants," but this term as hereinafter used is not to be construed to mean an agent capable of effecting a precipitation alone. I also concentrate the solution to such a point that sodium chloride is precipitated and may be removed by simple filtration. The order of the steps may be reversed, according to the desired results, the nature of the precipitant, etc.

In order that my invention may be clearly set forth and understood, I will now describe, with reference to the treatment of the particular gas purification liquor recited above, the preferred manner in which it is accomplished and performed.

A convenient weight of liquor of known composition is heated to a temperature of 60° to 70° C. in a suitable reaction vessel, preferably equipped with a heating jacket or coils and a stirring device. To it is added a concentrated solution of calcium chloride, preferably of a concentration equal to about 50% calcium chloride by weight. The requisite quantity may be determined from the following reactions:

1. $2NaCNS + CaCl_2 = Ca(CNS)_2 + 2NaCl$
2. $Na_2S_2O_3 + CaCl_2 = CaS_2O_3 + 2NaCl$
3. $Na_2CO_3 + CaCl_2 = CaCO_3 + 2NaCl$
4. $Na_4Fe(CN)_6 + CaCl_2 = CaNa_2Fe(CN)_6 + 2NaCl$.

The behaviour of the sodium ferrocyanide in the reaction mixture is not definitely known, but it is certain that it is converted to some insoluble ferrocyanide.

In addition to the calculated amount, an excess of 2% of calcium chloride is added to insure complete reaction. Before adding the calcium chloride solution, it is preferably heated to from 100° to 105° C. and it is then added slowly to the heated liquor. The temperature of the reaction mixture is now increased to from 110° to 120° C. and maintained within this range for about one hour, during which period of time the heavy viscous mass is agitated constantly.

While it is preferred to allow one hour for the reaction to be completed, in many instances, the reaction may be completed at the end of 30 minutes and, in others, it may be necessary to maintain this temperature for a longer period than one hour. However, this is within the discretion of the operator. During the said reaction period, the conversion of calcium thiosulphate to calcium sulphite and sulphur is accomplished.

The reaction mixture is now cooled to a temperature preferably below 50° C. and filtered in any suitable manner. The precipitate or filter cake consists of sodium chloride, calcium carbonate, calcium sulphite, sulphur, sodium calcium ferrocyanide, and some coloring matter and dirt, and is discarded or further treated by any suitable process for recovery of its constituents. The filtrate, in addition to calcium thiocyanate, also contains some sodium chloride and small amounts of coloring and colloidal matter. I further treat this filtrate, as indicated above, with a precipitant for oxidation and/or precipitation of coloring and colloidal matter; and separately for the removal of sodium chloride.

I may use various precipitants, such as milk of lime, bleaching powder, sodium perborate, chlorine water, hydrogen peroxide or the like, either alone or in combination with others, and, according to the specific precipitant used and the result desired, the procedure will be varied. For this reason, I will recite various examples of the purification of this crude calcium thiocyanate liquor.

Example I

By adding water, the specific gravity of the crude calcium thiocyanate solution is reduced to between 1.22 and 1.25. It is then treated at ordinary temperatures with a predetermined quantity of milk of lime, agitated for from 15 to 30 minutes, and then filtered. The lime should be suspended in such a quantity of water that the specific gravity of the treated solution does not fall below 1.2 at 25° C. for the reason that, at about this specific gravity, the calcium hydroxide is least soluble in the calcium thiocyanate solution and may subsequently be substantially completely removed therefrom.

The filtrate from the above filtration operation, consisting principally of calcium thiocyanate and containing also sodium chloride, is now evaporated, preferably in vacuo, to a specific gravity equivalent to from 1.4 to 1.41 at 25° C. and cooled to below 40° C. At this temperature and concentration, the sodium chloride is practically insoluble in the calcium thiocyanate solution. The solution is then filtered to remove said sodium chloride. The filtrate is now a substantially pure solution of calcium thiocyanate and may be further concentrated to yield crystalline calcium thiocyanate $Ca(CNS)_2 \cdot 3H_2O$.

Example II

The crude calcium thiocyanate liquor is evaporated to a specific gravity equivalent to 1.4 to 1.41 at 25° C. and cooled to below 40° C. The sodium chloride precipitates and is removed by filtration. The filtrate, containing calcium thiocyanate, coloring matter and colloidal matter, is now treated with a solution of bleaching powder in predetermined quantity, heated to a temperature of from 90° C. to 100° C., and maintained at this temperature for from 20 to 30 minutes with agitation. The mixture is then cooled and filtered. The filtrate is a substantially pure solution of calcium thiocyanate and may be further concentrated to yield substantially pure crystalline calcium thiocyanate ($Ca(CNS)_2 \cdot 3H_2O$).

*Example III*

When the complete removal of sodium chloride is not necessary, the crude calcium thiocyanate solution may be treated directly with a precipitant, such as bleaching powder, evaporated to a specific gravity equivalent to 1.4 to 1.41 at 25° C., cooled to below 40° C. and filtered. This filtration will remove the colloidal and coloring matter and most of the sodium chloride and the filtrate may be concentrated to yield nearly pure calcium thiocyanate, although, as indicated above, this product will still contain very small amounts of sodium chloride.

In any of the filtration steps described above, any of the various well-known supplementary means, such as activated carbon, silica-gel, fuller's earth, calcined alumina, and the like may be used in conjunction with the filtration to yield a very pure and light-colored calcium thiocyanate.

My invention has numerous advantages which will easily appear from the foregoing and from a comparison with the prior art. I provide a process for obtaining a substantially pure calcium thiocyanate in a simple manner without elaborate purification and crystallization steps and from a cheap and complex raw material—in fact, a waste product—containing large quantities of salts other than the sodium thiocyanate from which the calcium thiocyanate is prepared. The apparatus, reagents, and time required for the preparation of substantially pure calcium thiocyanate, according to my process, are all cheapened or reduced to a very advantageous point.

While my invention is hereinabove described with reference to the treatment of a particular material and including certain specific examples by way of illustration, it may otherwise be embodied or practiced within the scope of the claims hereinafter made.

I claim as my invention:

1. The process of obtaining a solution of alkaline earth metal thiocyanate from gas purification liquor which comprises treating the liquor with a soluble alkaline earth metal salt, heating the mixture to near the boiling point, allowing it to cool and removing insoluble material therefrom.

2. The process of obtaining a solution of alkaline earth metal thiocyanate from gas purification liquor which comprises treating the liquor with a soluble alkaline earth metal salt, heating the mixture to such a point that alkaline earth metal thiosulphate present is decomposed and subsequently removing insoluble material therefrom.

3. The process of obtaining a solution of alkaline earth metal thiocyanate from gas purification liquor which comprises treating the liquor with a soluble alkaline earth metal salt, heating the mixture to a temperature above 110° C., allowing it to cool and removing insoluble material therefrom.

4. The process of obtaining a solution of alkaline earth metal thiocyanate from gas purification liquor which comprises heating and agitating the liquor in the presence of alkaline earth metal chloride at a temperature near the boiling point and subsequently filtering the liquor to remove insoluble material therefrom.

5. The process of obtaining a solution of alkaline earth metal thiocyanate from gas purification liquor containing sodium thiosulphate and sodium thiocyanate which comprises treating the liquor with a soluble alkaline earth metal salt, heating the liquor to such a point that alkaline earth metal thiosulphate will be decomposed to insoluble alkaline earth metal sulphite and sulphur, cooling the liquor and filtering it to remove insoluble material.

6. The process of obtaining alkaline earth metal thiocyanate from gas purification liquor which comprises treating the liquor with a soluble alkaline earth metal salt, heating the liquor to near the boiling point, cooling and filtering the liquor to remove insolubles and subsequently treating the filtrate to recover alkaline earth metal thiocyanate therefrom.

7. The process of obtaining alkaline earth metal thiocyanate from gas purification liquor which comprises treating the liquor with a soluble alkaline earth metal salt, heating the liquor to near the boiling point, cooling and filtering it to remove insolubles, treating the filtrate with a reagent capable of precipitating colloidal and coloring matter, re-filtering the liquor to remove such precipitate and treating the filtrate to recover alkaline earth metal thiocyanate therefrom.

8. The process of obtaining alkaline earth metal thiocyanate from gas purification liquor which comprises treating the liquor with a soluble alkaline earth metal salt, heating the liquor to near the boiling point, cooling and filtering it to remove insolubles, treating the filtrate with a reagent capable of precipitating colloidal and coloring matter, while maintaining the liquid at a specific gravity of from 1.22 to 1.25, re-filtering the liquor to remove such precipitate and subsequently treating the filtrate to recover alkaline earth metal thiocyanate therefrom.

9. The process of obtaining alkaline earth metal thiocyanate from gas purification liquor which comprises treating the liquor with a soluble alkaline earth metal salt, heating the liquor to near the boiling point, cooling and filtering it to remove insolubles, treating the filtrate with a reagent capable of precipitating colloidal and coloring matter, re-filtering the liquor to remove the precipitate thus formed, evaporating the filtrate to a specific gravity of approximately 1.4, allowing it to cool, filtering it to remove insolubles and evaporating the filtrate to recover alkaline earth metal thiocyanate.

10. The process of obtaining a solution of calcium thiocyanate from gas purification liquor which comprises treating the liquor with a soluble calcium salt, heating the mixture to such a point that calcium thiosulphate present is decomposed and subsequently removing insoluble material therefrom.

In testimony whereof, I have hereunto subscribed my name this 22nd day of December, 1926.

ROBERT R. FULTON.